Apr. 24, 1923.

W. KLOCKE 1,452,609

FRICTION CLUTCH

Filed July 25, 1921

2 Sheets-Sheet 2

Inventor:
William Klocke,
By Attorneys,

Patented Apr. 24, 1923.

1,452,609

UNITED STATES PATENT OFFICE.

WILLIAM KLOCKE, OF WOODHAVEN, NEW YORK, ASSIGNOR TO E. W. BLISS COMPANY, OF BROOKLYN, NEW YORK, A CORPORATION OF WEST VIRGINIA.

FRICTION CLUTCH.

Application filed July 25, 1921. Serial No. 487,460.

*To all whom it may concern:*

Be it known that I, WILLIAM KLOCKE, a citizen of the United States of America, residing in Woodhaven, in the county of Queens and State of New York, have invented certain new and useful Improvements in Friction Clutches, of which the following is a specification.

This invention relates to friction clutches, and aims to provide improvements therein.

The invention provides a light, simple, durable, efficient, cool running and economically manufactured friction clutch.

The invention further provides a novel and advantageous combination of parts for carrying out the purposes of a friction clutch.

An embodiment of the invention is illustrated in the accompanying drawings, wherein—

Figure 1:
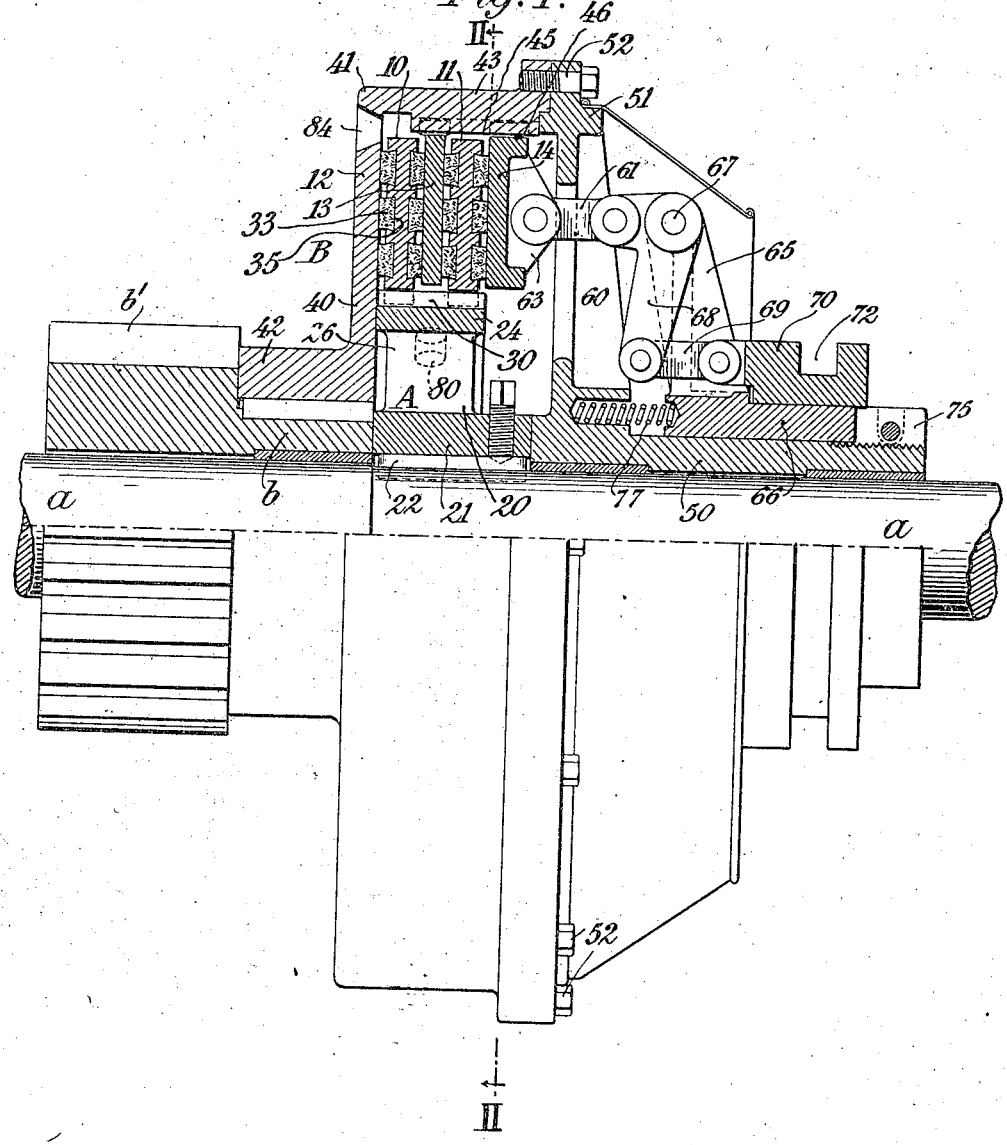
Figure 2:
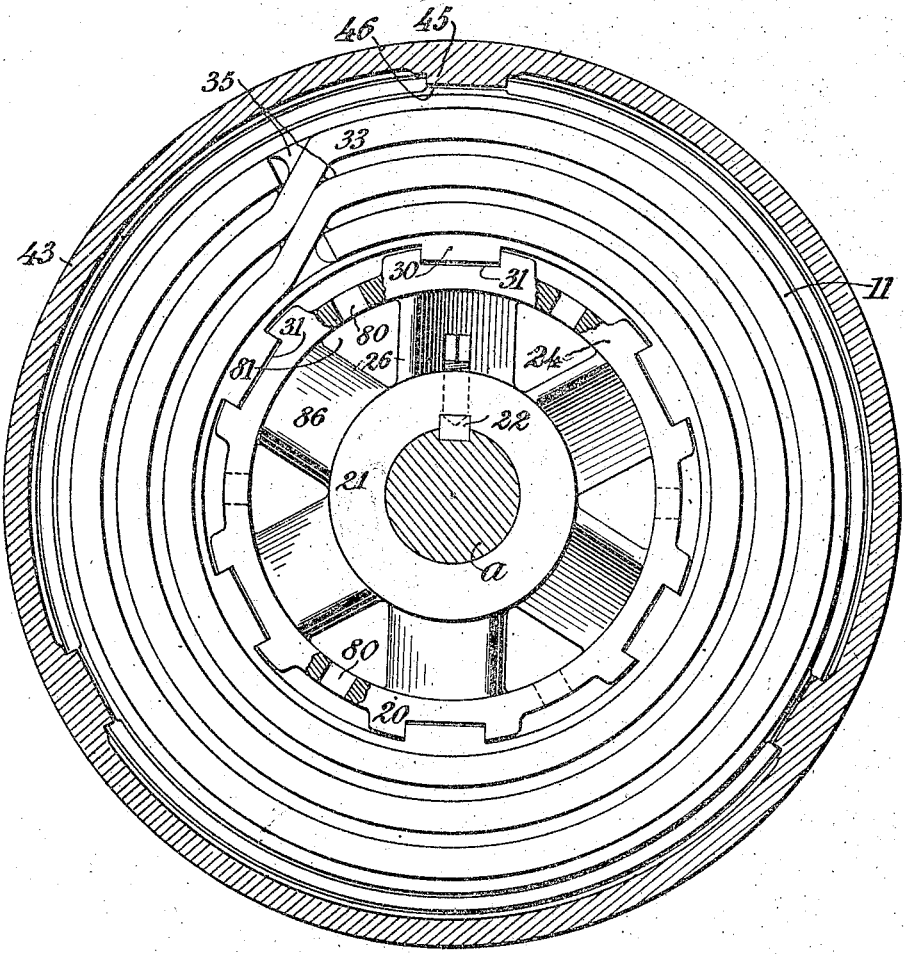

Figure 1 is a cross-section of said embodiment longitudinally of the shaft on which it is mounted, and Fig. 2 is a cross-section on the line II—II, Fig. 1.

Referring to said drawings, the letter A designates the running or driving parts of the clutch, and B designates the passive or driven parts of the clutch.

The running parts A of the clutch are adapted to be, and are here shown as, fixed upon a shaft $a$ which is turned continuously, as the back-shaft of a press. The passive parts B of the clutch are fixed to a shaft or other part to be driven, here shown as a sleeve $b$ carrying a pinion $b^1$, adapted to mesh with a companion gear upon the machine or transmission with which the clutch is associated.

The running part of the clutch A comprises one or more plates or disks 10, 11, and the passive part comprises one or more disks or plates 12, 13, 14, the two sets of disks or plates being interposed.

The running part A also comprises a disk carrier 20, conveniently comprising a hub having a bearing portion 21 adapted to be keyed or otherwise secured to the back-shaft $a$, as indicated at 22, a rim portion 24, and one or more webs 26. The running disks 10, 11, are conveniently connected with the carrier 20 by means of ribs and grooves 30, 31, in such manner that the disks turn with the said carrier 20, but may move axially thereof.

One set of the disks may be provided with friction material 33 on its face or faces, the disk being preferably constructed as set forth and claimed in my application Serial No. 455,716, filed March 26, 1921, the friction material being an endless strip placed in a groove or grooves 35 in one or both faces of the disk.

Where the disks are made with inserted friction material, the said disks, being relatively heavy, are preferably attached to the disk carrier 20 of the running part A of the clutch, and as one set of the disks is an odd number, the running disks, with inserted friction material, are preferably made the lesser in number; that is, an even number.

The passive part B of the clutch also comprises a carrier 40 for the passive disks, the said carrier 40 conveniently comprising a drum 41 and a hub 42, and the web connecting the hub 42 to the cylindrical portion 43 of the drum and the disk 12, are conveniently formed as one part. The passive disks 13 and 14 are conveniently attached to the cylindrical part 43 of the drum by means of a key and groove 45, 46, in such manner that the said disks may turn with the drum, and move axially thereof.

The overhanging part 43 of the drum is conveniently supported by a sleeve 50 adapted to bear on the back-shaft $a$, and having a flange 51 which is fastened to the said drum in suitable manner, as by means of bolts 52.

Means 60 are provided for pressing the series of disks 10 and 14, inclusive, so as to frictionally engage and bind, and thereby entrain the passive part, so that it runs with the running part and thereby operates the machine or other part driven by the pinion $b^1$. The disk-pressing means 60 conveniently comprises a toggle 61 pivoted at one end to an ear 63 formed conveniently on the passive plate 14, and the other end of the toggle conveniently has pivotal bearing on an arm 65 forming part of a bracket 66, as indicated at 67. One arm of the toggle 61 is conveniently formed solid with an arm 68 connected by a link 69 to a collar 70 conveniently sliding on the bracket 66 and adapted to be operated by a yoke engaging the annular groove 72 in the collar 70, as is usual.

The bracket 66 having pivoted thereon one end of the toggle 61, is preferably made adjustable toward the disks, as by means of a collar 75 threaded on the said sleeve 50. A spring 77 may be provided for pressing the bracket into firm contact against the said collar 75, the resiliency of the spring permitting of the ready adjustment of the bracket. When wear occurs in the disks so that the toggles, when at the limit of their movement, are not able to force the disks into binding contact, the brackets 66 carrying the arms 65 may be adjusted slightly toward the disks, carrying the pivots 67 of the toggles towards the disks, and consequently enabling the toggles, when the disks are pressed together, to press said disks with sufficient force to bind, and thereby entrain the passive member B of the clutch. This means provides a simple and ready means of adjusting the clutch to compensate for wear of the disks.

Means are preferably provided for producing a flow of air between the disks, for the purpose of removing the heat due to the friction of said disks. This means conveniently comprises a passage or passages 80 formed in the rim 24 of the carrier 20 of the running member A, where air in the space 81, between the rim 24 and hub or bearing part 21 may be thrown by centrifugal force outward between the disks, thereby taking heat from the disks. Passages 84 are conveniently formed in the outer part of the carrier 40 of the passive disks to facilitate the flow of the air through the clutch. The flow of the air between the disks will also be assisted by the action of the running disks which will also act to give the air a centrifugal flow. Moreover, fan blades may be provided for initiating or assisting the flow of the air between the disks, and the web or webs 26 between the rim 24 and bearing hub portion 21 are conveniently formed as fan blades, the blades or webs 26 conveniently being arranged diagonally, as indicated at 86, Fig. 2. The blades 26 act to catch the air and compress it in the space 81, thus promoting the flow through the passages 80, and between the disks.

The operation of the clutch has been described in connection with its construction.

The inventive ideas herein set forth may receive other embodiments than that herein specifically illustrated and described.

What is claimed is:

A clutch comprising interposed friction disks, and carriers for said disks, one of said carriers being a central hub-member having a rim, an inner bearing part adapted to be fixed to a shaft and an intermediate web connecting said rim and bearing part, said rim having an opening therein for permitting flow of a current of air to the inner faces of said disks, said other carrier being a drum having an opening therein to permit the outflow of air from the vicinity of the outer edges of said disks, and having a bearing at one side of said first-named carrier, a bearing sleeve at the opposite side of said first-named carrier having a flange, and means connecting said flange to said drum, and means mounted on said sleeve for pressing said disks together, said means comprising a toggle, a bracket on said sleeve adjustable toward said disks, said toggle being pivoted at one end to a disk, and at its other end to said bracket, an operating arm connected to said toggle, and a sleeve for moving said operating arm.

In witness whereof, I have hereunto signed my name.

WILLIAM KLOCKE.